United States Patent [19]
Seefluth

[11] 3,817,677
[45] June 18, 1974

[54] METAL NECK FORMING PLUG HAVING POLYTETRAFLUOROETHYLENE SHOULDER

[75] Inventor: Charles L. Seefluth, Bartlesville, Okla.

[73] Assignee: Philips Petroleum Company, Bartlesville, Okla.

[22] Filed: July 31, 1972

[21] Appl. No.: 276,678

[52] U.S. Cl.......... 425/393, 425/392, 425/DIG. 203
[51] Int. Cl............................................. B29c 17/00
[58] Field of Search.. 425/393, DIG. 203, DIG. 206, 425/469, 342, 326 B, 324 B, 406, 392

[56] References Cited
UNITED STATES PATENTS

| | | | |
|---|---|---|---|
| 3,025,562 | 3/1962 | Nelson | 425/393 X |
| 3,303,249 | 2/1967 | Strauss | 425/392 X |
| 3,360,826 | 1/1968 | Lorang | 425/393 X |
| 3,390,426 | 7/1968 | Turner et al. | 425/330 X |
| 3,412,187 | 11/1968 | Fogelberg et al. | 264/98 X |
| 3,507,005 | 4/1970 | Wiley et al. | 425/387 B X |
| 3,632,713 | 1/1972 | Seefluth | 425/387 B X |
| 3,649,150 | 3/1972 | Gilbert | 425/378 X |
| 3,695,805 | 10/1972 | Gilbert | 425/393 |

*Primary Examiner*—Richard B. Lazarus

[57] ABSTRACT

In an apparatus for stretching a parison preform at orientation temperature and thereafter expanding same out into conformity with a neck forming means, a plug is provided for moving axially into said parison said plug having a first metal section of reduced diameter and a second metal section adjacent to said first having a larger diameter, said first and second sections being connected by a sloping shoulder section made of polytetrafluoroethylene.

9 Claims, 4 Drawing Figures

PATENTED JUN 18 1974　　3,817,677
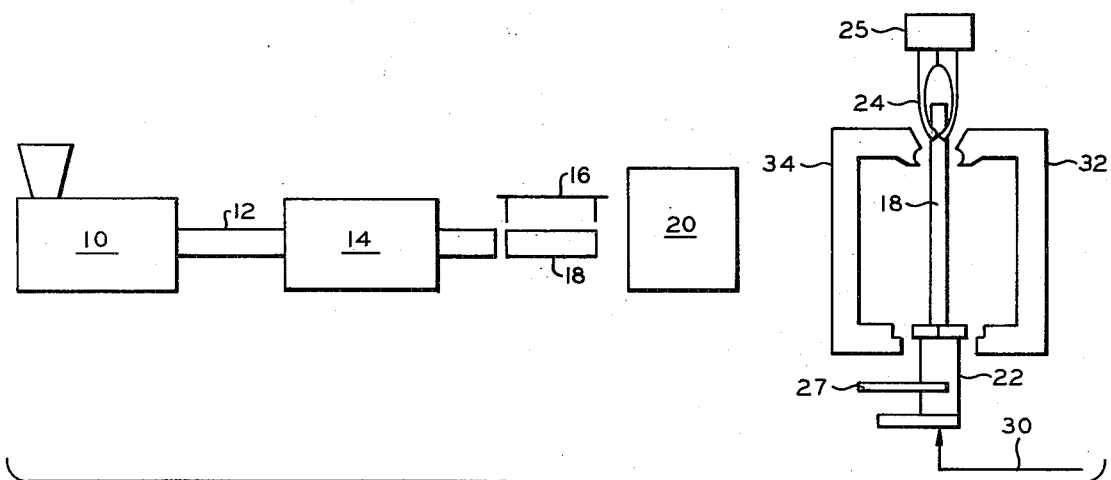
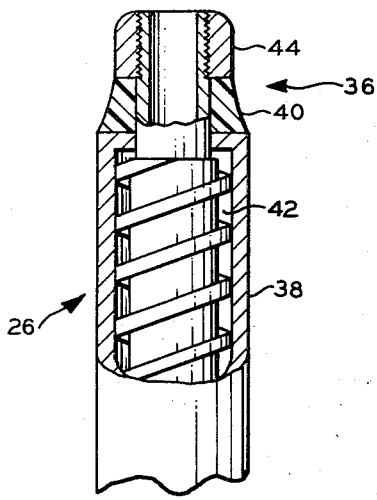
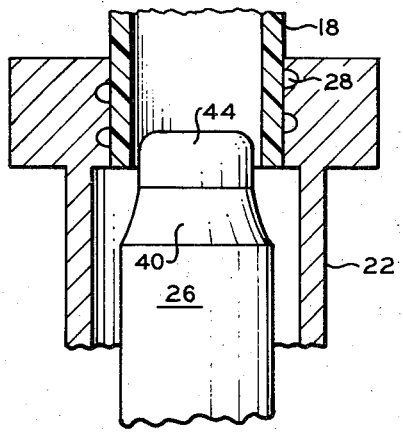
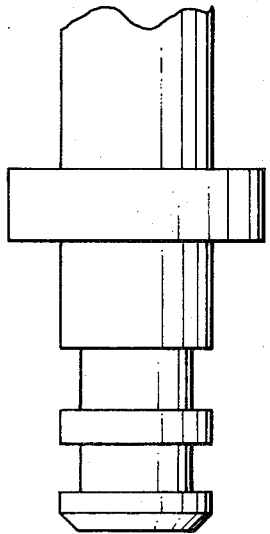
FIG. 2
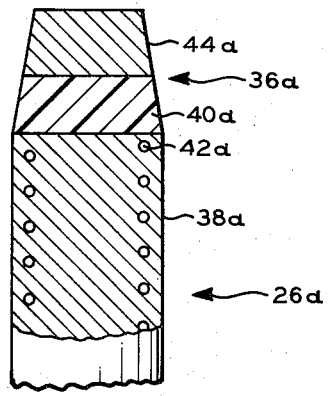
FIG. 1
FIG. 3
FIG. 4

METAL NECK FORMING PLUG HAVING POLYTETRAFLUOROETHYLENE SHOULDER

BACKGROUND OF THE INVENTION

This invention relates to apparatus for forming hollow articles by blow molding a thermoplastic parison at the orientation temperature of said thermoplastic.

Patents in the blow molding art go back for over 100 years; however, it has been only in the last dozen years or so that this technique has achieved significant commercial success. Recently techniques have been developed for forming biaxially oriented hollow articles utilizing a technique wherein a parison is fabricated at orientation temperature. Such techniques are disclosed in Wiley U.S. Pat No. 3,288,317 and Turner et al U.S. Pat No. 3,390,426, for instance. The techniques disclosed in said Wiley and Turner et al patents make possible the production of articles having very desirable properties, which properties cannot be obtained in conventional processes. However, by virtue of the fact that the parison is at orientation temperature during the fabrication process, many manipulative operations which are easily carried out on a thoroughly molten parison, present special problems utilizing this technique.

One particularly difficult problem is getting a good finish on the neck and/or thread area. A tapered plug can be inserted into the interior of the parison to force it out into conformity with thread-forming jaws. However, because the parison is at orientation temperature, which is well below the point at which it is molten, a substantial amount of force is required to accomplish this. It has been found that with plugs made of metal such as steel, the parison is pushed out of the molding jaws, rather than being expanded into conformity with the thread-forming zone. Various plastic materials known to have good high temperature properties and low coefficient of friction have been tried but they tend to wear out and/or develop a build-up of deposits which causes sticking.

SUMMARY OF THE INVENTION

It is an object of this invention to provide an improved apparatus for forming biaxially oriented hollow articles; and it is a further object of this invention to provide apparatus for forming bottles and the like having the advantage of high strength imparted by molecular orientation without any sacrifice and the quality of the detail in the neck and thread area.

In accordance with this invention, one end of a thermoplastic parison at orientation temperature is expanded out into conformity with a neck forming zone by means of the insertion of a plug having a first metal section of reduced diameter and a second metal section adjacent to said first section having a larger diameter, said first and second sections being connected by a sloping shoulder section made of polytetrafluoroethylene.

BRIEF DESCRIPTION OF THE DRAWINGS

In the drawings, forming a part hereof, wherein like reference characters denote like parts in the various views;

FIG. 1 is a schematic representation of a molding apparatus adapted to utilize the instant invention;

FIG. 2 is a longitudinal sectional view of a plug in accordance with the invention;

FIG. 3 is a detailed view showing the relationship of the plug to the gripping jaws; and FIG. 4 is a longitudinal sectional view of a plug in accordance with an alternative embodiment of the invention.

DESCRIPTION OF THE PREFERRED EMBODIMENTS

This invention is applicable to the formation of any biaxially oriented article having neck and/or thread areas which requires reasonably precise detail.

The invention is applicable to the production of these articles from any orientable thermoplastic resin. Exemplary resins are polyolefins, poly(vinyl chloride), acrylonitrile-butadiene-styrene polymers, styrene-butadiene containing copolymers, vinylidene chloride polymers and copolymers, polyamides, polystyrene, polyesters and the like. Preferred resins include crystalline polymers such as polymers of at least one mono-1-olefin having two to eight carbon atoms per molecule, more preferably polymers and copolymers of ethylene, propylene, and 1-butene, with polypropylene being especially preferred.

The thermoplastic is first extruded or molded into parison preforms and cooled to solidify same. The parisons are then heated to orientation temperature, which in the case of olefin polymers is generally about 1–50, preferably 5°–25°F below the crystalline melting temperature. The crystalline melting temperature can be determined by placing a small sample of the material to be tested on a heating stage of a polarizing microscope and recording the crystalline melting point as that temperature at which the last birefringence disappears on slow heating. Orientation temperature for amorphous polymers is generally 40–200, preferably 75°–150°F below the homogeneous melt point. The parison preforms can be heated to this orientation temperature in an air oven, in a liquid bath, in a heating block, or by subjecting them to radiant heat or any other suitable means.

While the stretching, insertion of the plug, and expansion into conformity with the mold is generally carried out in a room at ambient temperature, the sequence of steps is sufficiently rapid that the polymer remains at orientation temperature throughout the operation.

The plug must have an initial reduced diameter section to enable it to be inserted into the end of the parison. This initial reduced diameter section can either be cylindrical which is the preferred embodiment as shown in FIGS. 2 and 3 or tapered as shown in FIG. 4. The plug then has a second section of larger diameter. Both the first section of reduced diameter and the second section of larger diameter are made of metal. Any suitable metal can be utilized such as brass, iron, stainless steel, copper, or aluminum. A particularly suitable alloy is a cobalt alloy sold under the trademark Stellite which alloy has a composition comprising the following: 40–80 percent cobalt; 20–35 percent chromium; 0.75–2.5 percent carbon; 0–25 percent tungsten; 0–5 percent nickel; 0–5 percent iron; 0–3 percent manganese; 0–3 percent silicon; and 0–2 percent molybdenum, all percentages being based on weight. The larger diameter section preferably is machined to give a surface smoothness of 1–125 microinches, root means square (r.m.s.) preferably 10–75 r.m.s. Preferably at least the larger diameter section is cooled by means of circulating water or air or air saturated with water vapor or water droplets through the interior thereof.

Between the removable reduced diameter initial section of the plug and the larger diameter section is a sloping shoulder section. This shoulder section can have either straight tapered sides as shown in FIG. 4 or preferably curved sides as shown in FIGS. 2 and 3. It is preferred that this section be made of cast or machined polytetrafluoroethylene. Suitable high molecular weight, high temperature resistant polytetrafluoroethylene is commercially available under the trademark Teflon. It is preferred that the polytetrafluoroethylene shoulder not simply be a thin coating over a metal substrate but rather must be cast or machined. Other thermoplastic materials known to have low coefficient of friction such as Kel-F (trademark) have been found not to work successfully.

The plug of the instant invention allows precise tolerances to be maintained in the neck area of the finished product because the large diameter metal section of the plug does not wear or distort in the manner a plug made entirely of polytetrafluoroethylene does. The polytetrafluoroethylene shoulder allows the plug to be slipped into the parison forcing same radially outwardly without dragging the parison out of the thread forming jaws as happens with an ordinary metal plug. The polytetrafluoroethylene shoulder section is preferably in the form of an annular ring which can be slipped into place to facilitate easy replacement.

Referring now to the FIGURES, particularly FIG. 1, there is shown an extrusion means 10 for forming tubular extrudate 12. The tubular extrudate passes through vacuum cooling and sizing chamber 14 and thence to cutter 16 where it is severed into individual parison preforms 18. Parison preforms 18 pass through air oven 20 where they are heated to orientation temperature. Thereafter, the parison preforms 18 are transferred to thread forming jaws 22 by means of gripping fingers 24. Gripping fingers 24 then move up through the action of cylinder 25 to stretch the parison axially. Either before, during, or after the stretching operation, plug 26 (see FIG. 3) moves upward to force the lower end of parison 18 out into conformity with thread forming contours 28 of jaws 22. Axial stretching can be accomplished by moving gripping fingers 24 upwardly after jaws 22 have clamped around the other end of the parison. While the FIGURES show the bottle being blown in an upside down position the entire operation can be inverted whereby the plug descends from the top to form the threads with the mold means sealing the parison and forming the bottom wall of the resulting article at the bottom. The plug is attached to a mechanism connected to apparatus schematically represented by lever 27 which causes axial movement of the plug to effect insertion of the plug into the end of the parison. Thereafter, fluid pressure is introduced via line 30 to expand said parison out into conformity with the molding zone formed by mold halves 32 and 34.

Referring to FIG. 2 there is shown a plug 26 having an initial cylindrical section 36 of reduced diameter and a second section 38 of larger diameter said first and second metal sections being connected by sloping shoulder section 40 made of polytetrafluoroethylene. Plug 26 is cooled internally by means of circulating water through cooling channels 42. The second section will generally have a diameter within the range of 1.1 to 2, preferably 1.1 to 1.4 times the diameter of the first section. The intermediate sloping shoulder can vary greatly in length thus varying the degree of slope. A suitable length is one-fourth to 1 times the length of the small section.

Referring now to FIG. 4, there is shown an alternative embodiment wherein said first section 36a has a tapered configuration and said second section 38a is cooled by means of water channels 42a. Conecting adjacent first and second metal sections 36a and 38a is shoulder section 40a which is an annular ring of polytetrafluoroethylene having straight sloping sides.

Annular member 44 of section 36 or tapered member 36a simply screws off to allow insertion of new annular polytetrafluoroethylene rings.

Many conventional parts have been omitted, such as temperature controllers, frame elements, motors, and the like but their inclusion is understood by those skilled in the art and is within the scope of the invention.

EXAMPLE I

Propylene homopolymer having a density of 0.905 (ASTM D 1505-63T), a melt flow of 2 (ASTM D 1238-62T, Condition L), and a crystalline melting point of about 340°F was extruded into tubing having an outside diameter of about 0.85 inch and a wall thickness of about 0.15 inch. This tubing was cooled to room temperature, cut into 5 inch lengths, and reheated to about 325°F. A thus heated parison was then grasped at one end thereof by pinching fingers such as those shown in the drawings and at the other end thereof by thread forming jaws such as those shown in the drawings. It was then stretched to about 200 percent of its original length and a plug having the configuration shown in FIG. 2 was moved axially into the open end of the parison to expand same out into conformity with the thread forming means of the jaws. The plug had an initial cylindrical section made of 303 stainless steel having an outside diameter of 0.484 inch. The second section of larger diameter was also made of 303 stainless steel and had an outside diameter of 0.594 inch. Connecting the two sections was an annular ring made of polytetrafluoroethylene forming a sloping connecting shoulder between the two sections. The reduced diameter cylindrical section was 0.390 inch in length, the polytetrafluoroethylene connecting shoulder was about 0.255 inch in length and the cylindrical section of larger diameter was 2.875 inches in length. Thereafter, internal fluid pressure was introduced into the parison to expand same out into conformity with the mold walls to produce a bottle having excellent tolerance in the thread area. This operation was carried out on a cyclic basis producing a plurality of bottles having good detail in the thread area.

CONTROL

An identical plug to that of Example I was made using all stainless steel. This plug was used in the identical apparatus on identical parisons to that of Example I. The operation was unsatisfactory as a result of the plug pushing the parison out of the thread forming jaws and/or causing the end of the parison to curl over and be pushed down into the interior thereof. This difficulty was experienced under both high and low insertion rates.

CONTROL II

A plug identical in shape to that of FIG. 2 was made utilizing a steel shoulder area and a polytetrafluoroethylene sleeve over the large diameter main body portion. This plug was used in the identical apparatus on identical parisons to that of Example I. The results were unsatisfactory in the same manner as in Control I.

CONTROL III

A plug made entirely of trifluorochloroethylene polymer was utilized in the identical apparatus of Example I utilizing identical parisons. The results were unsatisfactory as in Controls I and II.

While this invention has been described in detail for the purpose of illustration, it is not to be construed as limited thereby, but is intended to cover all changes and modifications within the spirit and scope thereof.

I claim:

1. Apparatus comprising in combination:
   an axially extending jaw means adapted to grasp an open end of a tubular parison;
   an axially extending plug having a first metal section of reduced diameter and a second metal section adjacent to said first section having a larger diameter, said first and second sections being connected by a shoulder section made of polytetrafluoroethylene;
   said plug being disposed coaxially with said jaw means and being axially movable so as to be inserted into said open end of said parison which is gripped by said jaw means, said jaw and plug being so disposed relative to each other that said reduced diameter section is first inserted into said end of said parison and said shoulder section forces said parison radially outward while said large diameter metal section imparts precise tolerance to a neck area of said open end of said parison.

2. Apparatus according to claim 1 wherein said first section is generally cylindrical.

3. Apparatus according to claim 1 wherein said second section has a surface finish within the range of 1–125 microinches root mean square.

4. Apparatus according to claim 1 wherein said second section has a surface finish within the range of 10–75 microinches root mean square.

5. Apparatus according to claim 1 wherein said second section has internal cooling means.

6. Apparatus according to claim 1 wherein said polytetrafluoroethylene shoulder portion is formed by machining or casting.

7. Apparatus according to claim 1 wherein said second section has a diameter of 1.1–2 times the diameter of said first section.

8. Apparatus according to claim 1 wherein said second section has a diameter of 1.1–1.4 times the diameter of said first section.

9. Apparatus according to claim 8 wherein said first section is generally cylindrical, and said second section has a surface finish of 10–75 microinches root mean square and is internally cooled.

* * * * *